United States Patent [19]

Schmidt et al.

[11] 4,073,757

[45] Feb. 14, 1978

[54] HARDENABLE, BORON-CONTAINING REINFORCING RESINS FOR RUBBER

[75] Inventors: Manfred Schmidt; Dieter Freitag, both of Krefeld; Hermann Fries, Schildgen; Erich Esch, Leverkusen, all of Germany

[73] Assignee: Bayer Aktiengesellschaft, Leverkusen, Germany

[21] Appl. No.: 749,456

[22] Filed: Dec. 10, 1976

[30] Foreign Application Priority Data

Dec. 20, 1975 Germany .............................. 2557613

[51] Int. Cl.$^2$ ........................... C08C 4/00; C08G 8/32
[52] U.S. Cl. ................................ 260/19 R; 260/2 M; 260/19 N; 260/23.7 M; 260/775
[58] Field of Search ................ 260/19 R, 19 N, 2 M, 260/23.7 M, 775

[56] References Cited

U.S. PATENT DOCUMENTS

| 2,022,827 | 12/1935 | Ruben | 260/19 N |
|---|---|---|---|
| 3,117,153 | 1/1964 | Aldridge et al. | 260/2 M |
| 3,189,567 | 6/1965 | Giller | 260/19 N |
| 3,384,586 | 5/1968 | McMillen | 260/19 N |
| 3,455,851 | 7/1969 | Meredith et al. | 260/19 N |

OTHER PUBLICATIONS

Chemical Abstracts, vol. 81, No. 10, Sept. 9, 1974, p. 50472y.
Chemical Abstracts, vol. 83, No. 10, Sept. 8, 1975, p. 80240e.

Primary Examiner—Ronald W. Griffin
Attorney, Agent, or Firm—Connolly and Hutz

[57] ABSTRACT

Boron-containing resins suitable for reinforcing rubber are obtained by reacting diphenylol alkane novolaks with boron compounds and unsaturated fatty acids or fatty acid esters.

10 Claims, No Drawings

HARDENABLE, BORON-CONTAINING REINFORCING RESINS FOR RUBBER

It is known, for example from DT-OS 2,245,812, that plastics materials produced by the condensation of novolaks based on monofunctional phenols and boric acid alkyl esters can be used as bonding agents for filler additives. High-temperature-resistant moulding compositions suitable for the production of friction linings are obtained in this way.

When worked into rubber, however, modified synthetic resins such as these produce an undesirable increase in viscosity and, for this reason, adversely affect further processability. Hitherto they have been used as hardeners in nitrile rubber (NBR) only, producing no hardening effect in other rubber materials.

The production of novolaks by condensing diphenylol propane (bisphenol A) with formalin in the presence of an organic solvent is known from DT-OS 1,570,351. Products of this kind are not suitable for use as reinforcing resins for rubbers because, when hardened in the presence of a formaldehyde donor such as hexamethylene tetramine, for example, novolak-rubber mixtures of the kind in question adhere to a considerable extent to the mixing and calender rolls.

In addition, DT-OS 2,436,358 describes thermosetting boron-containing synthetic resins produced by condensing mixed boric acid esters of phenols, diphenylol propane and alcohols with paraformaldehyde. When hardened in admixture with, for example, NBR and a formaldehyde donor such as hexamethylene tetramine, these products produce a marked increase in the viscosity of the unvulcanised mixture which adversely affects further processing, and in addition have no hardening effect in styrene-butadiene rubber (SBR).

It has now surprisingly been found that resins obtained by the partial transesterification of a diphenylol alkane novolak with boric acid alkyl esters, optionally formed in situ, and partial reaction with an unsaturated fatty acid or esters thereof, have excellent properties as reinforcing resins and may be used in rubbers. When the mixture of resin and unvulcanised rubber is hardened with a formaldehyde donor, such as hexamethylene tetramine for example, a viscosity of the mixture low enough for further processing is retained. After corresponding mouldings have been fully vulcanised, they show excellent hardness values which they retain even under heat.

For example, the addition of 10% by weight of a resin according to the invention to SBR gives a degree of hardness equivalent to that obtained by adding 45% by weight of a standard commercial grade low molecular weight styrene polymer hardener to SBR. At the same time, the SBR-based rubber mouldings hardened by the resins according to the invention are distinguished by the outstanding resistance of their hardness properties to high temperature, unlike SBR-based rubber mouldings hardened by a standard commercialgrade thermoplastic reinforcing agent, such as low molecular weight polystyrene.

Accordingly, the present invention relates to a process for the production of hardenable, boron-containing reinforcing resins for rubber by reacting diphenylol alkane novolaks with boron compounds and unsaturated fatty acids or fatty acid esters, distinguished by the fact that diphenylol alkane novolaks with an average molecular weight (osmotically determined) Mos of from 400 to 1600, preferably from 600 to 1200, are reacted with from 20 to 100 parts by weight of a boric acid trialkyl ester containing from 1 to 4 carbon atoms per alkyl chain or with from 18 to 90 parts by weight of boric acid or with from 10 to 50 parts by weight, preferably from 15 to 20 parts by weight, of boron trioxide in the presence of a $C_1$–$C_4$-alcohol, after which the boric acid ester resins obtained are reacted at elevated temperatures with from 15 to 35 parts by weight of an unsaturated fatty acid or esters thereof.

The invention also relates to the boron-containing resins obtainable by the process described above which are soluble in methanol, ethanol, propanol, isopropanol, butanol, isobutanol, dioxane, tetrahydrofuran, acetone, methylethyl ketone, ethyl acetate, butyl acetate, methyl and ethylene glycol acetate, and have an iodine number of from 80 to 200, preferably from 110 to 170, an OH-number of from 200 to 500, preferably from 240 to 450, and a boron content of up to 7% by weight, preferably from 1.5 to 5% by weight.

The diphenylol alkane novolak corresponds to the following formula:

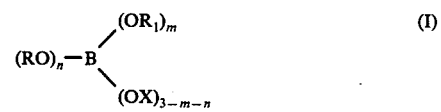

in which:
m, n have values between 1 and 2, with the proviso that $m+n \leq 2$,

R represents $C_1$–$C_4$-alkyl, such as methyl, ethyl, propyl or butyl, $R_1$ represents R or X, X represents a novolak which is obtained by the condensation of an aldehyde with a diphenylol alkane or with a mixture of diphenylol alkanes and hydroxy (phenyl hydroxy) indanes in the presence of acid catalysts and which contains free phenolic OH-groups.

The novolaks required are produced from diphenylol alkanes or mixtures of diphenylol alkanes corresponding to formula (II), of the type described for example in DT-AS 1,235,894:

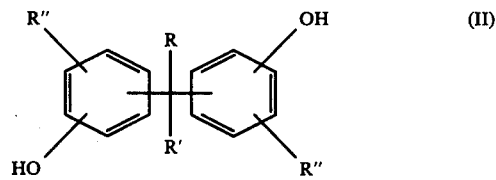

in which:
R = $C_1$–$C_8$-alkyl, $C_5$–$C_{12}$-cycloalkyl,

R' = H or R, or

R and R' = $C_4$–$C_7$-alkylene, in addition to which R and R' may form a carbocyclic ring with the carbon atom by which they are joined, and R" = H or $C_1$–$C_4$-alkyl.

Mixtures of diphenylol alkanes of the general formula (II) with hydroxy phenyl hydroxy indanes of the general formula (III):

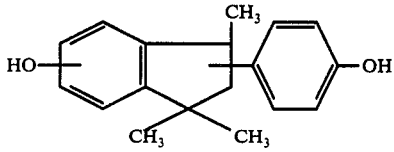

(III)

of the type obtained as residual resins (so-called "primary resins") in the synthesis of bisphenol A, may also be used for the production of the novolaks.

It is preferred to use bisphenol A or a mixture of bisphenol A isomers with hydroxy phenyl hydroxy indanes corresponding to the general formula (III), the ratio by weight of the bisphenol A isomers to the hydroxy phenyl hydroxy indanes of the general formula (III) amounting to between 4:1 and 9:1 and preferably to between 6:1 and 8:1.

The diphenylol alkane or diphenylol alkane mixture is reacted with from 100 to 140 mole % and preferably with from 120 to 130 mole % of an aldehyde in the presence of from 40 to 150 parts by weight and preferably in the presence of from 60 to 80 parts by weight of an organic solvent (based on 100 parts by weight of the diphenylol alkane), such as for example benzene, toluene, xylene, ethyl acetate, butylacetate, methyl glycol or ethylene glycol acetate and in the presence of from 0.01 to 1 mole %, preferably 0.5 mole %, of an acidic organic or inorganic catalyst or mixtures thereof, the reaction being carried out at boiling temperature in known manner. The reaction time amounts to between about 20 minutes and 2 hours and preferably to between 30 minutes and 1 hour.

Chloral, furfurol, propionaldehyde, butyraldehyde, acetaldehyde and formaldehyde may be used as aldehydes. It is preferred to use aqueous formalin solution, trioxane or paraformaldehyde.

The acid catalysts used are solid and liquid organic acids, such as oxalic acid, succinic acid, acetic acid and lactic acid. Inorganic acids, such as hydrochloric acid, hydrobromic acid, phosphoric acid and combinations of the above-mentioned organic and inorganic acids may also be used. Oxalic acid and phosphoric acid are preferably used.

Boric acid alkyl esters are compounds corresponding to the formula $B(OR)_3$, in which R represents an alkyl radical with from 1 to 4 carbon atoms, such as methyl, ethyl, propyl or butyl. The ester used for the reaction is usually formed in situ from the corresponding alcohol and boron trioxide or boric acid. It is, of course, also possible to use separately synthesised boric acid esters.

Suitable unsaturated fatty acids or their esters are compounds with from 24 to 41 carbon atoms in the acid moiety and, in the case of the ester, with from 1 to 4 carbon atoms, in the alkyl chain of the alcohol moiety. Monoglycerides, diglycerides or triglycerides may also be used.

The following compounds, for example, may be used as unsaturated fatty acids or their esters:

Linseed oil fatty acid, soya oil fatty acid, tall oil fatty acid, peanut oil fatty acid, commercial-grade conjugated unsaturated fatty acids, such as conjuene fatty acid, ricinoleic acid, ricinene fatty acid or mixtures thereof, and also their glycerides or glyceride mixtures or their methyl esters or methyl ester mixtures.

It is preferred to use linseed oil fatty acid, soya oil fatty acid, conjuene fatty acid and castor oil.

The unsaturated fatty acids or their esters preferably have iodine numbers above 40.

The reaction of diphenylol alkane novolaks with the boron compounds is carried out as follows:

The diphenylol alkane novolak is diluted in 40 to 120 parts by weight, preferably 60 to 100 parts by weight (based on 100 parts by weight of diphenylol alkane) of an alcohol ROH, in which R is a straight-chain or branched alkyl group with from 1 to 4 carbon atoms, such as methyl, ethyl, propyl, isopropyl, butyl, isobutyl or t-butyl, preferably ethyl. It is, of course, also possible to use the novolak solution or novolak suspension left behind after the azeotropic distillation of water in the production of the novolak.

10 to 50 parts by weight of boron trioxide and preferably 15 to 20 parts by weight of boron trioxide, or 18 to 90 parts by weight of boric acid, preferably 25 to 36 parts by weight of boric acid, are added to the alcoholic solution of the novolak followed by reaction at reflux temperature for 30 minutes to 3 hours to form a mixed aliphatic-aromatic boric acid ester. Instead of using boron trioxide or boric acid, it is of course also possible to use separately synthesised boric acid alkyl esters.

The reaction of the mixed aliphatic-aromatic boric acid ester formed with the unsaturated fatty acids or their esters is carried out as follows:

The boric acid ester is reacted with 15 to 35 parts by weight and preferably with 20 to 27 parts by weight (based on 100 parts by weight of the diphenylol alkane) of the unsaturated fatty acid or its ester for 10 to 60 minutes and preferably for 15 to 30 minutes at a bath temperature of from 100° to 200° C, preferably from 130° to 170° C.

The solution formed during the production of the above boric acid ester may, of course, also be used. In this case, approximately 80% by weight of the total quantity of solvent has to be distilled off.

After the reaction with the unsaturated fatty acid or its ester, the residual solvent and monomeric reaction products are distilled off first under normal pressure and then in a water jet vacuum. The resin is run off from the reaction vessel in liquid form and is ground after solidification.

In a variant of the process according to the invention as described above, both the reaction steps and also the component reaction steps described may be carried out at the same time providing all the reactants are simultaneously introduced accordingly.

For example, it is possible to add the fatty acids or their esters to the diphenylol alkane novolak together with the boric acid alkyl esters, boric acid or boron trioxide.

In cases where they are used as reinforcing resins for natural and/or synthetic rubbers, the resins according to the invention are incorporated in the presence of a formaldehyde donor, such as for example hexamethylene tetramine, paraformaldehyde, trioxy or tetraoxy methylene, on the mixing units normally used for processing rubber, such as for example rolls, kneaders and high speed mixers. The resins according to the invention are incorporated at temperatures in the range of from 70° to 120° C and preferably at temperatures in the range of from 80° to 100° C.

The following are mentioned as examples of natural and/or synthetic rubbers:

Natural rubber, styrene-butadiene rubber, chloroprene rubber, nitrile rubber, isoprene rubber, butadiene rubber, EPDM, butyl rubber and transpolypentenamer rubber.

The usual fillers, such as active silicas, carbon black, kaolin, chalk, and also antiagers, crosslinking chemicals, vulcanisation accelerators and other standard additives, may be added to the rubbers.

The resins according to the invention are added to the rubbers in quantities sufficient to produce a reinforcing effect, preferably in quantities of from 5 to 10 parts by weight and with particular preference in quantities of from 10 to 60 parts by weight, based on 100 parts by weight of rubber.

The rubber mixtures thus produced may be processed by the usual techniques, for example moulding, extrusion or calendering, to form shaped articles such as, for example, soles, rollers, floor coverings and sealing rings. Vulcanisation is carried out by the usual processes, for example in presses, in steam, in hot air tunnels or in salt baths, at temperatures in the range of from about 130° to 210° C.

The invention is illustrated by the following Examples.

All percentages are by weight unless otherwise indicated.

EXAMPLE 1

1.14 kg (5 moles) of bisphenol A are suspended in 700 ml of toluene. 25 g of oxalic acid are added, followed by the introduction over a period of 10 minutes, with intensive stirring, of 550 g of a 35% formalin solution (6.4 moles), the formalin solution being added under nitrogen at reflux temperature. The reaction mixture is stirred at boiling temperature for 30 minutes, after which 2 g of phosphoric acid (85%) are added and the mixture is left to react for another 15 minutes at boiling temperature. The water is then distilled off azeotropically (approximately 440 ml) whilst the organic solvent is recycled. 1 liter of ethanol is added, giving a clear solution into which 200 g (6.75 equivalents) of boron trioxide are introduced. After 2 hours' reaction under reflux with intensive stirring, approximately 80% of the total quantity of solvent is distilled off at normal pressure. 300 g of castor oil are added to the low viscosity reaction product. This is followed by reaction for another 15 minutes at a bath temperature of 150° C. The remaining solvent is then distilled off in a water jet vacuum (distillation time: 30 minutes to 1 hour). The residual viscous resin is removed from the reaction vessel and ground after solidification.

Yield: 1.8 kg.
Softening point: 91° C
Iodine number: 156
OH-number: 352
Boron: 2.9%

The hardener resin obtained in accordance with Example 1 is worked into (a) a standard rubber mixture based on SBR (styrene-butadiene rubber) and (b) a standard rubber mixture based on NBR (acrylonitrilebutadiene rubber)

and the hardening effect or positive change in the mechanical properties of the vulcanisates produced from these rubber mixtures are compared with the effects obtained with conventional styrene-butadiene-resins (containing approximately 85% of styrene) in SBR, or with standard phenol-formaldehyde resins in NBR.

(a) Mixtures based on SBR (A, B, C) are produced in accordance with the following basic recipes. Vulcanisates with the physical properties listed below are produced from these mixtures. The values of the crude mixtures are also quoted in order to demonstrate the processing behaviour under the effect of the resins.

| Mixtures | A parts by weight | B parts by weight | C parts by weight |
|---|---|---|---|
| SBR (Buna Huls 1507) | 100.0 | 100.0 | 100.0 |
| Stearic acid | 2.0 | 2.0 | 2.0 |
| Zinc oxide, active | 3.0 | 3.0 | 3.0 |
| Silica (Vulkasil S) | 30.0 | 30.0 | 30.0 |
| Diethylene glycol | 2.5 | 2.5 | 2.5 |
| Antiager Vulkanox DS | 1.5 | 1.5 | 1.5 |
| Sulphur | 2.2 | 2.2 | 2.2 |
| Vulkacit DM | 2.2 | 2.2 | 2.2 |
| Vulkacit thiuram | 0.75 | 0.75 | 0.75 |
| Styrene resin (Duranit B) | — | 30.0 | — |
| Hexamethylene tetramine (Vulkacit H30) | — | — | 3.6 |
| Hardening resin (according to Example 1) | — | — | 30.0 |
| Physical properties of the crude mixtures | | | |
| Viscosity (Defo hardness/ elasticity) according to DIN 53 514 | 400/20 | 500/23 | 675/12 |

| Physical properties of the vulcanisates after the vulcanisation of 4 mm test Specimens (vulcanisation: 30' at 150° C) | according to DIN: | A | B | C |
|---|---|---|---|---|
| Tensile strength (MPa) | 53 504 | 4.7 | 7.2 | 6.3 |
| Elongation at break (%) | 53 504 | 350 | 350 | 335 |
| Modulus 100 % (MPa) | 53 504 | 1.6 | 1.9 | 3.5 |
| Hardness (Shore A at 20/75° C) | 53 505 | 63/62 | 68/58 | 87/82 |
| Shock elasticity (% at 20/75° C) | 53 512 | 51/61 | 46/52 | 46/50 |
| Structural strength (N) (according to Pohle) | | 60 | 80 | 90 |

(b) Mixtures based on NBR (D, E, F) are produced in accordance with the following basic recipes. Vulcanisates with the physical properties listed below are produced from these mixtures. The values of the crude mixtures are also quoted in order to demonstrate the processing behaviour under the effect of the resins.

| Mixtures: | D parts by weight | E parts by weight | F parts by weight |
|---|---|---|---|
| NBR (Perbunan-N-3307 NS) | 100.0 | 100.0 | 100.0 |
| Stearic acid | 1.5 | 1.5 | 1.5 |
| Antiager Vulcanox PAN | 1.5 | 1.5 | 1.5 |
| Carbon black N 774 (Durex 0) | 30.0 | 30.0 | 30.0 |
| Carbon black N 330 (Corax 3) | 15.0 | 15.0 | 15.0 |
| Zinc oxide, active | 5.0 | 5.0 | 5.0 |
| Sulphur | 1.8 | 1.8 | 1.8 |
| Vulkacit CZ | 1.0 | 1.0 | 1.0 |
| Hexamethylene tetramine (Vulkacit H 30) | — | — | 3.6 |
| Phenol-formaldehyde resin (Vulkadur A) | — | 30.0 | — |
| Hardening resin (according to Example 1) | — | — | 30.0 |
| Physical values of the crude mixtures | D | E | F |
| Viscosity (Defo hardness/ elasticity at 80° C) according to DIN 53 514 | 1275/17 | 1375/18 | 1025/20 |
| Physical properties of the vulcanisates after the vulcanisation of 4 mm test specimens (vulcanisation: 30' at 150° C) according to DIN: | | | |
| Tensile strength (MPa) | 53504 | 14.8 | 19.3 | 18.5 |
| Elongation at break (%) | 53504 | 380 | 330 | 345 |
| Modulus 100 % | 53504 | 3.9 | 5.2 | 5.7 |

|   | | | |
|---|---|---|---|
| (MPa) Hardness (Shore A at 20/75° C | 53505 | 74/72 | 79/75 | 80/75 |
| Shock elasticity (at 20/75° C) | 53512 | 28/62 | 22/57 | 28/50 |
| Structural strength (N) (according to Pohle) |  | 110 | 130 | 170 |

EXAMPLE 2

A resin is prepared with the same starting materials, the same quantities and under the same reaction conditions as in Example 1, except that, instead of 300 g of castor oil, the same quantity by weight of a commercial grade conjugated unsaturated fatty acid (Konjuvandol fatty acid, a product of Unichema) is used. Working up in the same way as in Example 1 gives 1.8 kg of a resin having a softening point of 74° C.

Iodine number: 156
OH-number: 316
Boron 3.2%

Following the procedure described in Example 1, the hardener resin obtained in accordance with Example 2 is worked into SBR and tested in comparison with a standard styrene-butadiene resin (containing approximately 85% of styrene).

| Mixtures: | A parts by weight | B parts by weight | C parts by weight |
|---|---|---|---|
| SBR (buna Huls 1507) | 100.0 | 100.0 | 100.0 |
| Stearic acid | 2.0 | 2.0 | 2.0 |
| Zinc oxide, active | 3.0 | 3.0 | 3.0 |
| Silica (Vulkasil S) | 30.0 | 30.0 | 30.0 |
| Diethylene glycol | 2.5 | 2.5 | 2.5 |
| Antiager Vulkanox DS | 1.5 | 1.5 | 1.5 |
| Sulphur | 2.2 | 2.2 | 2.2 |
| Vulkacit DM | 2.2 | 2.2 | 2.2 |
| Vulkacit thiuram | 0.75 | 0.75 | 0.75 |
| Styrene resin (Duranit B) | — | 30.0 | — |
| Hexamethylene tetramine (Vulkacit H 30) | — | — | 3.6 |
| Hardener resin (according to Example 2) | — | — | 30.0 |
| Physical properties of the crude mixtures | | | |
| Viscosity (Defo hardness/ elasticity) according to DN 53514 | 400/20 | 500/23 | 600/16 |
| Physical properties of the vulcanisates after the vulcanisation of 4 mm test specimens vulcanisation: 30' at 150° C | according to DIN: | | |
| Tensile strength (MPa) | 53504 | 4.7 | 7.2 | 6.1 |
| Elongation at break (%) | 53504 | 350 | 350 | 280 |
| Modulus 100 % (MPa) | 53504 | 1.6 | 1.9 | 3.9 |
| Hardness (Shore A at 20/75° C) | 53505 | 63/62 | 68/58 | 86/79 |
| Shock elasticity (% at 20/75° C) | 534512 | 51/61 | 46/52 | 46/51 |
| Structural strength (N) | (according to Pohle) | 60 | 80 | 85 |

EXAMPLE 3

The "primary resin" obtained during the production of bisphenol A, a mixture of bisphenol A isomers with hydroxy phenyl hydroxy indane and hydroxy phenyl hydroxy chromane isomers in a ratio by weight of approximately 7:1:1, is used for this Example.

1.24 kg of the primary resin are suspended in 700 ml of toluene and reacted in accordance with Example 1. Instead of 300 g of castor oil, an equivalent quantity of Konjuvandol fatty acid, a product of Unichema, is used.

Working up in the same way as in Example 1 gives 1.7 kg of a resin having a softening point of 76° C.

Iodine number: 143
OH-number: 450
Boron: 2.7%

Following the procedure described in Example 1, the hardener resin obtained in accordance with Example 3 is worked into (a) a standard rubber mixture based on SBR (mixture C) and (b) a standard rubber mixture based on NBR (mixture F), and the hardening effect or positive change in the mechanical properties of the vulcanisates produced from these rubber mixtures are compared with the effects obtained using conventional styrene-butadiene resins in SBR (mixture B) or using standard phenol-formaldehyde resins in NBR (mixture E).

| a) Mixtures: | A parts by weight | B parts by weight | C parts by weight |
|---|---|---|---|
| SBR (Buna Huls 1507) | 100.0 | 100.0 | 100.0 |
| Stearic acid | 2.0 | 2.0 | 2.0 |
| Zinc oxide, active | 3.0 | 3.0 | 3.0 |
| Silica (Vulkasil S) | 30.0 | 30.0 | 30.0 |
| Diethylene glycol | 2.5 | 2.5 | 2.5 |
| Antiager Vulkanox DS | 1.5 | 1.5 | 1.5 |
| Sulphur | 2.2 | 2.2 | 2.2 |
| Vulkacit DM | 2.2 | 2.2 | 2.2 |
| Vulkacit thiuram | 0.75 | 0.75 | 0.75 |
| Hexamethylene tetramine (Vulkacit H30) | — | — | 3.6 |
| Styrene resin (Duranit B) | — | 30.0 | — |
| Hardener resin (according to Example 3) | — | — | 30.0 |
| Physical properties of the crude mixtures | | | |
| Viscosity (Defo hardness/ elasticity) according to DIN 53 514 | 400/20 | 500/23 | 725/17 |
| Physical properties of the vulcanisates after the vulcanisation of 4 mm test specimens (vulcanisation: 30' 150° C) | according to DIN: | | |
| Tensile strength (MPa) | 53504 | 4.7 | 7.2 | 6.1 |
| Elongation at break (%) | 53504 | 350 | 350 | 325 |
| Modulus 100 % (MPa) | 53504 | 1.6 | 1.9 | 3.9 |
| Hardness (Shore A at 20/74° C) | 53505 | 63/62 | 68/58 | 87/80 |
| Shock elasticity (% at 20/75° C) | 53512 | 51/61 | 46/52 | 48/51 |
| Structural strength (N) | (according to Pohle) | 60 | 80 | 100 |

| b) mixtures | D parts by weight | E parts by weight | F parts by weight |
|---|---|---|---|
| NBR (Perbunan-N 3307 NS) | 100.0 | 100.0 | 100.0 |
| Stearic acid | 1.5 | 1.5 | 1.5 |
| Antiager Vulkanox PAN | 1.5 | 1.5 | 1.5 |
| Carbon black N774 (Durex 0) | 30.0 | 30.0 | 30.0 |
| Carbon black N 330 (Corax 3) | 15.0 | 15.0 | 15.0 |
| Zinc oxide, active | 5.0 | 5.0 | 5.0 |
| Sulphur | 1.8 | 1.8 | 1.8 |
| Vulkacit CZ | 1.0 | 1.0 | 1.0 |
| Hexamethylene tetramine (Vulkacit H 30) | — | — | 3.6 |
| Phenol formaldehyde resin (Vulkadur A) | — | 30.0 | — |
| Hardener resin (according to Example 3) | — | — | 30.0 |
| Physical properties of the crude mixtures | | | |
| Viscosity (Defo hardness elasticity) accoding to DIN 53 514 | 1275/17 | 1375/18 | 1325/14 |
| Physical properties of the vulcanisates after the vulcanisation of 44 mm test | | | |

| specimens (vulcanisation: 30' at 150° C) | according to DIN: | | | |
|---|---|---|---|---|
| Tensile strength (MPa) | 53504 | 14.8 | 19.3 | 15.7 |
| Elongation at break (%) | 53504 | 380 | 330 | 375 |
| Modulus 100 % (MPa) | 53504 | 3.9 | 5.2 | 5.1 |
| Hardness (Shore a at 20/75° C) | 53505 | 74/72 | 79/75 | 82/78 |
| Shock elasticity (% at 20/75° C) | 53512 | 28/62 | 22/57 | 27/47 |
| Structural strength (N) | (according to Pohle) | 110 | 130 | 170 |

We claim:

1. A process for the production of hardenable boron-containing reinforcing resins for rubber by reacting diphenylol alkane novolaks with boron compounds and unsaturated fatty acid or fatty acid esters, wherein 100 parts by weight of diphenylol alkane novolaks with an average molecular weight of from 400 to 1600 are reacted with from 20 to 100 parts by weight of a boric acid trialkyl ester containing from 1 to 4 carbon atoms in the alkyl chain or with from 18 to 90 parts by weight of boric acid or with from 10 to 50 parts by weight of boron trioxide in the presence of $C_1$–$C_4$-alcohols, and the boric acid ester resins obtained are reacted at elevated temperatures with from 15 to 35 parts by weight of an unsaturated fatty acid or esters thereof.

2. A process as claimed in claim 1, wherein the reaction of the diphenylol alkane novolaks with the boron compounds is carried out in an alcoholic solvent.

3. A process as claimed in claim 2, wherein the reaction is carried out under reflux over a period of from 30 minutes to 3 hours.

4. A process as claimed in claim 1, wherein the reaction of the boric acid ester resin with unsaturated fatty acids or esters thereof is carried out at temperatures in the range of from 100° to 200° C.

5. A process as claimed in claim 4, wherein the reaction is carried out at temperatures in the range of from 130° to 170° C.

6. A process as claimed in claim 1, wherein the reaction solution of the mixture of diphenylol alkane novolaks with boron compounds is used for the reaction with the unsaturated fatty acids or esters thereof.

7. A process as claimed in claim 1, wherein the diphenylol alkane novolaks used are reaction products of aldehydes with a diphenylol alkane corresponding to the general formula:

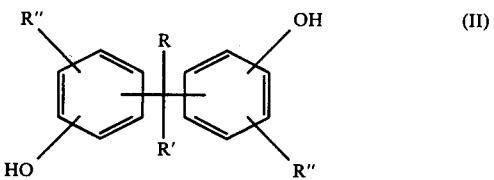

in which
R = $C_1$–$C_8$-alkyl, $C_5$–$C_{12}$-cycloalkyl,
R' = H or R, or
R and R' = $C_4$–$C_7$-alkylene, in addition to which R and R' form a carbocyclic ring with the carbon atom by which they are joined, and
R" = H or $C_1$–$C_4$-alkyl,
or mixtures of diphenylol alkanes of the general formula (II) with hydroxy phenyl hydroxy indanes corresponding to the general formula:

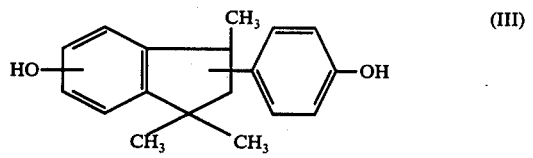

8. Boron-containing resins obtainable by the process claimed in claim 1 which are soluble in methanol, ethanol, propanol, isopropanol, butanol, isobutanol, dioxane, tetrahydrofuran, acetone, methylethyl ketone, ethyl acetate, butyl acetate, methyl and ethyl glycol acetate and have an iodine number of from 80 to 200, an OH-number of from 200 to 500 and a boron content of up to 7% by weight.

9. Boron-containing resins as claimed in claim 8 with an iodine number of from 110 to 170, an OH-number of from 240 to 450 and a boron content of from 1.5 to 5% by weight.

10. A process for the production of rubber vulcanisates with increased vulcanisate hardness and improved physical properties, wherein the boron-containing resins claimed in claim 8 are mixed with rubber at elevated temperatures in the presence of a formaldehyde donor and the resulting mixture is vulcanised.

* * * * *